J. Emerson,

Windlass.

No. 1,604. Reissued Jan. 12, 1864.

N. PETERS, PHOTO-LITHOGRAPHER, WASHINGTON, D. C.

UNITED STATES PATENT OFFICE.

JOSEPH P. MANTON, WM. H. REYNOLDS, FRANCIS W. REYNOLDS, AND WM. H. TAYLOR, OF PROVIDENCE, RHODE ISLAND, ASSIGNEES, BY MESNE ASSIGNMENTS, OF JAMES EMERSON.

IMPROVEMENT IN SHIPS' CAPSTANS AND WINDLASSES.

Specification forming part of Letters Patent No. 15,123, dated June 17, 1856; Reissue No. 1,604, dated January 12, 1864.

*To all whom it may concern:*

Be it known that JAMES EMERSON, of Worcester, in the county of Worcester and State of Massachusetts, has invented a new and useful Improvement in the Ship's Capstan and Windlass; and it is hereby declared that the following specification, taken in connection with the drawings, is a full, clear, and exact description thereof.

Figure 3:
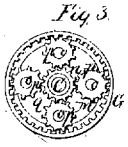
Figure 4:
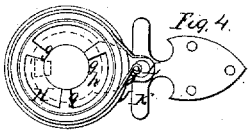
Figure 1:
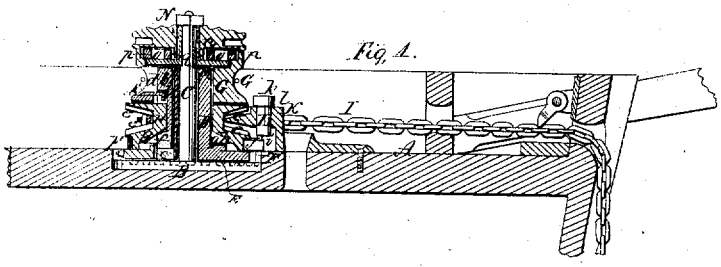
Figure 2:
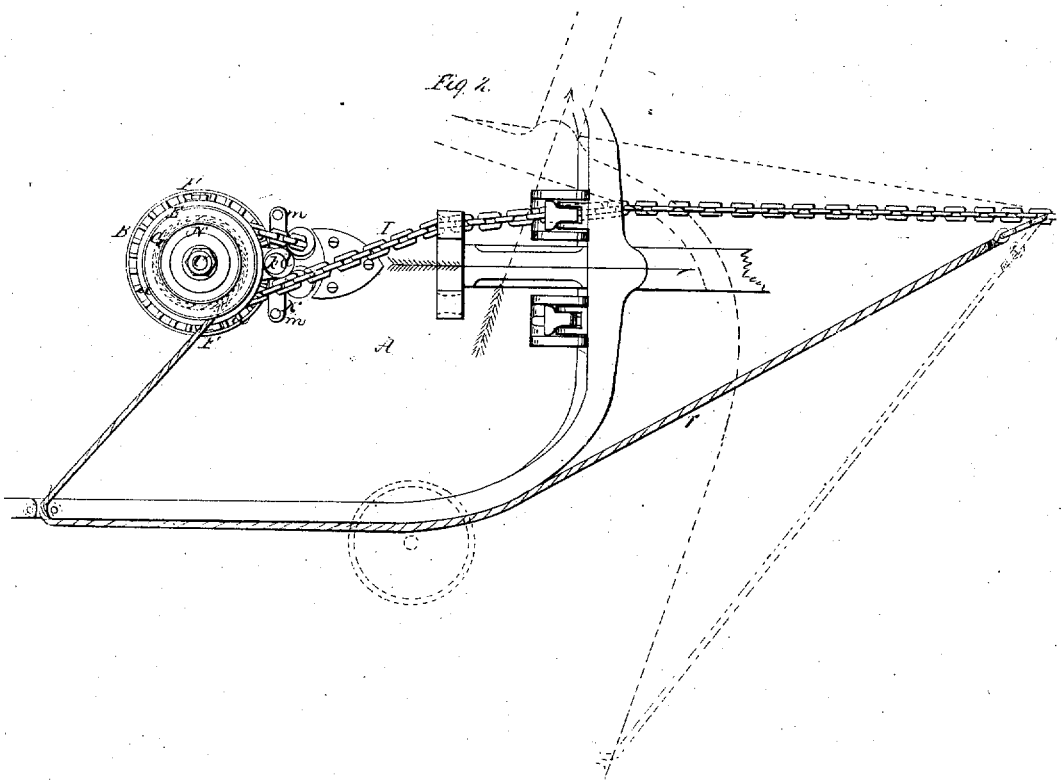

Figure 1 is a vertical section of the improvement, the plane of section being through the center. Fig. 2 is a plan or top view. Fig. 3 is a top view of the capstan, the cap being removed. Fig. 4 is an inverted plan of the wheel or windlass.

The invention which is the subject of this patent may be divided into two parts. The first part has reference to a means for controlling the independent chain-wheel or "wild-cat" of a capstan or windlass, and arresting its motion at will during the operation of paying out the cable or whenever it is desired to control its action; and the second part relates to a novel arrangement and combination of parts, whereby an ordinary power-capstan can be coupled or uncoupled at pleasure with a wild-cat or windlass-barrel, for the purpose of economizing space and accomplishing by one machine all the purposes of which both a capstan and a windlass are capable.

The method of bringing a vessel to an anchor before the invention of the said EMERSON was to bring up from the chain-locker to the deck a length of cable sufficient in the judgment of the pilot to enable the anchor to reach bottom and allow the vessel to ride easily. When the desired place of anchorage was reached, the anchor was dropped, and after it had found a holding-place the vessel brought up at the length of the chain already paid out. It is obvious that in the case of the largest size of cables the labor of handling the chain was a serious one, requiring much time and preparation to accomplish, and employing the services of not less than two-thirds of the crew. This, however, was not the only objection, as important as it was, to this plan. Too much or too little chain might have been brought up from the locker, in which case the vessel would either drag her anchor or fall back on the chain farther than was desired. In a narrow roadstead, or in a harbor crowded with other vessels, or under unfavorable circumstances of wind and shore, the consequences might be serious. Again, when a vessel is in the vicinity of land, but by reason of fogs, currents, or stress of weather has lost her reckoning and unexpectedly finds herself in shoal water, the safety of the ship may depend upon immediately, and as soon as the danger is discovered, bringing her to an anchor. On the other hand, the advantages of an arrangement whereby no handling of the chain is required before coming to anchor, but where the fall of the anchor pays it out from the locker, while as soon as holding-ground has been reached the vessel can be brought up and the length of chain at which she can best ride always under control, are of obvious value as preventing many of the accidents to which a vessel at such times when not under the influence of her helm is always exposed.

The means by which this result is accomplished consist in the application of a friction-strap to the barrel of the capstan or windlass, the chain cable being stowed in the locker, with the exception of so much of it as is required to make a partial turn around the wild-cat and reach the ring of the anchor. As the anchor is being raised, the chain passes from the windlass to the locker, and when it is dropped the wild-cat revolves in consequence of the chain running around it until the further paying out of the chain is arrested by the application of pressure from the strap, and the vessel brought up as gradually as is desired instead of with a shock.

In the accompanying drawings, A represents a portion of the deck of the vessel. G is a capstan in its relations to the other mechanism, to be more particularly described hereinafter, and H, located beneath it, is the wild cat, having on its periphery a V-shaped groove, and provided with lugs or projections *e*, between which the links of the cable catch. The wild-cat or wheel H is properly the windlass for the cable, (designated by I′,) which passes around it, as shown in Figs. 1 and 2. The lower part of the wheel H has a smooth periphery, around which the strap J, of thin metal, passes, and is, with the smooth part of the periphery of H, above mentioned, of sufficient width to insure the requisite amount of friction for the purposes necessary. One end of the friction-strap J is attached to a bar, K, in which a small shaft, L, is fitted to turn. The lower end of this shaft carries a pin, *j*, to which pin the other end of the strap is secured. (See Fig. 4.) Th upper end of the shaft L has a head, *k*, upon it, Fig. 1′, in which head are one or more holes, made to receive a hand-bar for the purpose of turning the shaft L and tightening the strap around the wheel H. The ends of the bar K have upright projections *m*, Fig. 2, one at each end, which serve as guides to the cable in its passage around the wild-cat. By the means above described the speed at which the cable shall be paid out is at all times under ready control, and when the vessel has received sufficient scope of chains she can be brought up gradually, and without any danger of starting her seams or timbers from a sudden shock.

The machinery appertaining to the second part of the invention of the said JAMES EMERSON may be described as follows:

B represents a circular plate fitted to the deck A of the vessel, having teeth or cogs *a* on its upper edge, as shown in Figs. 1 and 2. To the center of the circular plate B there is attached a vertical arbor, C. The plate B and arbor C are permanently attached to the deck. D represents a hollow shaft, which is fitted around the arbor C, and turns freely about it. To the lower end of the hollow shaft D there is attached a circular plate, E, which rests upon the plate B, the edge of the plate E extending as far as the teeth or cogs *a* on the plate B. (See Fig. 1.) F F are pawls attached to the edge or periphery of the plate E at opposite points, Fig. 1, and are located directly over the teeth or cogs on the plate B. G represents a capstan, which is fitted on the hollow shaft D, and is secured thereto by a key, *b*, which fits in a vertical groove, *c*, in the shaft D, and in a groove, *d*, in the inner side of the capstan G. The groove C in the shaft D extends through the plate E, as shown in Fig. 1. The capstan G and hollow shaft D always are connected, and consequently turn together on the arbor *c*. The wild-cat wheel H, referred to in the description of the first part of this invention, is placed so as to turn freely on the hollow shaft D, and is located underneath the capstan G. This wild-cat wheel is connected with and detached from the shaft D and capstan G by means of the key *b*, which has a projection, *f*, at its lower end, which projection, when the key *b* is raised, catches against projections *g* in a concave, *h*, in the under side of the wheel H. (See Figs. 1 and 4.) In consequence of the projection *f* on the key catching against the projection *g*, the wheel H will be connected and turn with the shaft D and capstan G; but if the key *b* is allowed to descend, the projection *f* will fall below the projections *g*, and the wheel will be disconnected from the shaft D and capstan G. The key *b* is retained in an elevated position by a wedge, *h′*, which is fitted in the side of the capstan, and when shoved inward passes under a projection, *i*, on the wedge.

The upper end of the capstan G is cogged in its periphery, a recess being made in the upper end of the capstan for that purpose, and also to receive a plate, M, which has a hollow shaft, *n*, attached to its center, the shaft *n* fitting around the arbor *c*. On the plate M there are four uprights, *o*, on which pinions *p* work, said pinions gearing into the teeth on the inner periphery of the capstan G. N is a metallic cap, through the center of which the arbor *c* passes. Said cap has a pinion, *q*, attached to the center of its under surface. This pinion gears into the pinions *p*. (See Fig. 3.)

From the above it will be seen that if the key *b* is elevated the wheel or windlass H will be connected and turn with the shaft D and capstan G. The key *b* is kept in an elevated position by the wedge *h*, and the capstan G is operated by levers in the usual way. The gears or pinions *p q* and cogged inner periphery of the capstan merely increase the power applied to the capstan E and windlass H.

By the use of the improvements which are the subject of this patent, vessels when at anchor may swing around with the greatest facility by attaching a hawser, *r*, to the cable I and to the capstan G, Fig. 2. This hawser, when thus applied, is technically termed a "spring." By referring to Fig. 2 it will be seen that if the capstan G is turned so as to wind the hawser upon it, and if the friction-strap J is loosened upon the periphery of the wheel or windlass H, so as to allow the chain or cable I to pay out gradually as the hawser *r* is wound upon the capstan, the vessel will be swung around, as indicated in red lines, with the greatest facility and in the smallest space possible.

What is claimed as the invention of the said JAMES EMERSON, and is desired to be secured by Letters Patent, is—

1. The combination, substantially as described, of a friction-brake with the independent chain-wheel or wild-cat of a ship's windlass or capstan, for the purpose of controlling the paying out of the cable of the vessel directly from the chain-locker.

2. The double or divided windlass or capstan, arranged for operation in the manner specified, and consisting of an upper hand operative portion of the body or capstan proper, G, and under loose portion of said body H, the former being capable of working independently of the latter or in connection with it at pleasure, substantially as herein described.

JOSEPH P. MANTON.
WM. H. REYNOLDS.
FRANCIS W. REYNOLDS.
WM. H. TAYLOR.

Witnesses:
BENJ. F. THURSTON,
STEPHEN A. COOKE, Jr.